(12) United States Patent
Shiokawa et al.

(10) Patent No.: US 10,388,974 B2
(45) Date of Patent: Aug. 20, 2019

(54) FUEL CELL SYSTEM AND EMERGENCY STOP METHOD

(71) Applicant: TOYOTA JIDOSHA KABUSHIKI KAISHA, Toyota-shi, Aichi-ken (JP)

(72) Inventors: Satoshi Shiokawa, Okazaki (JP); Yoshiaki Naganuma, Toyota (JP); Tomohiro Ogawa, Toyota (JP); Tsuyoshi Maruo, Toyohashi (JP); Hiroyuki Imanishi, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 14 days.

(21) Appl. No.: 15/180,526

(22) Filed: Jun. 13, 2016

(65) Prior Publication Data
US 2016/0380294 A1  Dec. 29, 2016

(30) Foreign Application Priority Data

Jun. 24, 2015 (JP) .................................. 2015-126287

(51) Int. Cl.
*H01M 8/04955* (2016.01)
*H01M 8/04828* (2016.01)
(Continued)

(52) U.S. Cl.
CPC ..... *H01M 8/04955* (2013.01); *H01M 8/0432* (2013.01); *H01M 8/04225* (2016.02);
(Continued)

(58) Field of Classification Search
None
See application file for complete search history.

(56) References Cited

U.S. PATENT DOCUMENTS

2008/0063902 A1\* 3/2008 Kawasaki ......... H01M 8/04007
429/10
2008/0081231 A1 4/2008 Kurita et al.
(Continued)

FOREIGN PATENT DOCUMENTS

DE 10 2007 046 298 A1 4/2008
JP 2004-103395 4/2004
(Continued)

*Primary Examiner* — Carmen V Lyles-Irving
(74) *Attorney, Agent, or Firm* — Finnegan, Henderson, Farabow, Garrett & Dunner, LLP.

(57) ABSTRACT

At an ordinary stop time of a fuel cell system, a controller of the fuel cell system completes an ordinary stop process that includes at least one of a water drainage process that discharges water from at least one of the fuel gas flow path and the oxidizing gas flow path and a cathode sealing process that seals the oxidizing gas flow path, and subsequently stops the fuel cell system. When the fuel cell system satisfies a predetermined emergency stop condition, the controller does not perform at least part of the ordinary stop process but performs an emergency stop process that sets the fuel cell system to be restarted after elapse of a first time period since a stop of the fuel cell system and subsequently stops the fuel cell system. The controller restarts the fuel cell system after elapse of the first time period since stop of the fuel cell system and performs a restart process that performs the ordinary stop process.

5 Claims, 5 Drawing Sheets

(51) Int. Cl.
    *H01M 8/04223*    (2016.01)
    *H01M 8/04291*    (2016.01)
    *H01M 8/0432*     (2016.01)
    *H01M 8/04664*    (2016.01)
    *H01M 8/04228*    (2016.01)
    *H01M 8/04225*    (2016.01)
    *H01M 8/04089*    (2016.01)
    *H01M 8/04119*    (2016.01)

(52) U.S. Cl.
    CPC ... *H01M 8/04228* (2016.02); *H01M 8/04253* (2013.01); *H01M 8/04291* (2013.01); *H01M 8/04679* (2013.01); *H01M 8/04828* (2013.01); *H01M 8/04097* (2013.01); *H01M 8/04164* (2013.01); *H01M 8/04686* (2013.01); *H01M 2250/20* (2013.01); *Y02T 90/32* (2013.01)

(56) References Cited

U.S. PATENT DOCUMENTS

2011/0039173 A1    2/2011  Kanazu
2015/0125767 A1*   5/2015  Wake ................ H01M 8/04291
                                                           429/414

FOREIGN PATENT DOCUMENTS

JP    2010-10050    1/2010
JP    2015-90779    5/2015

* cited by examiner

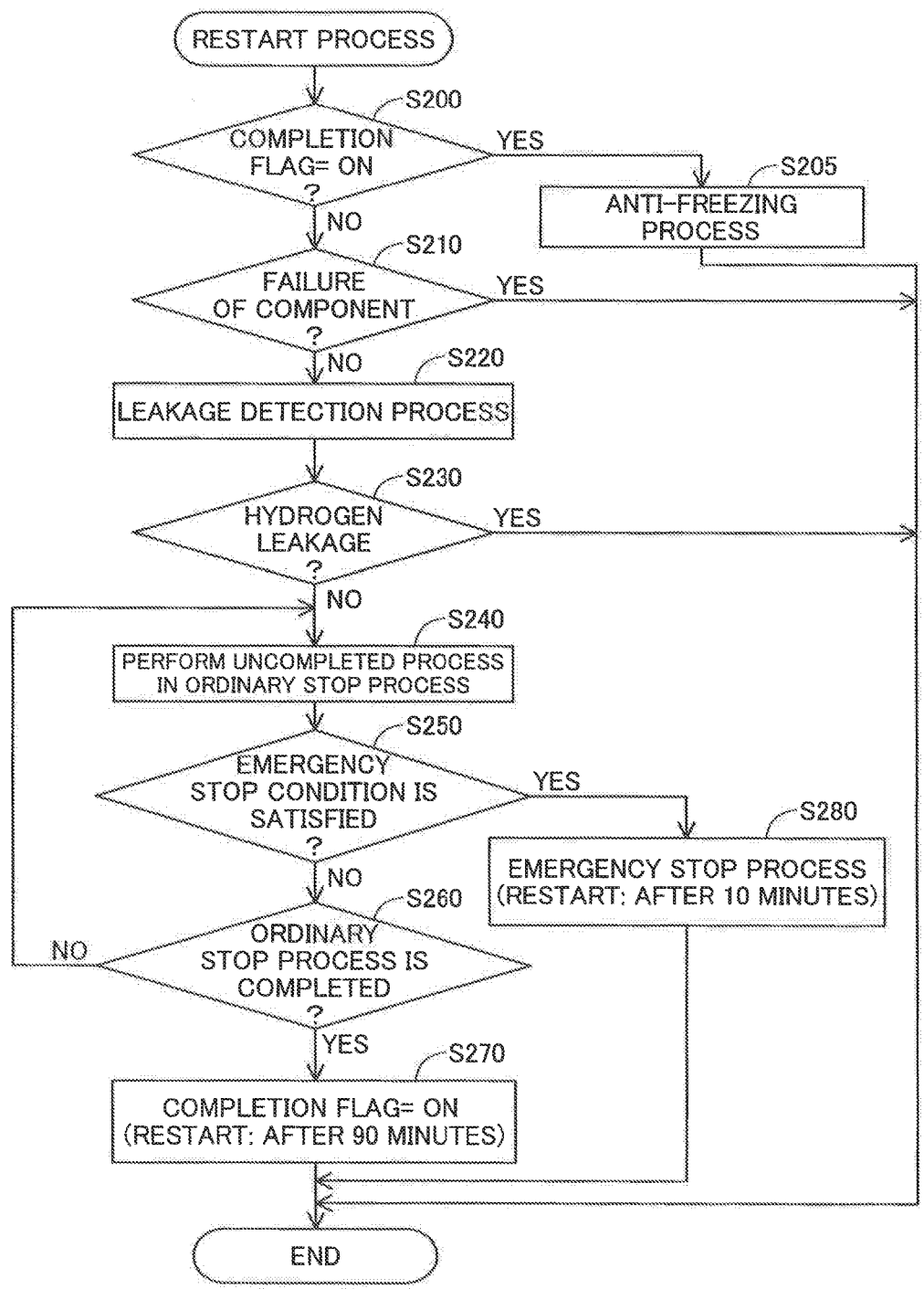

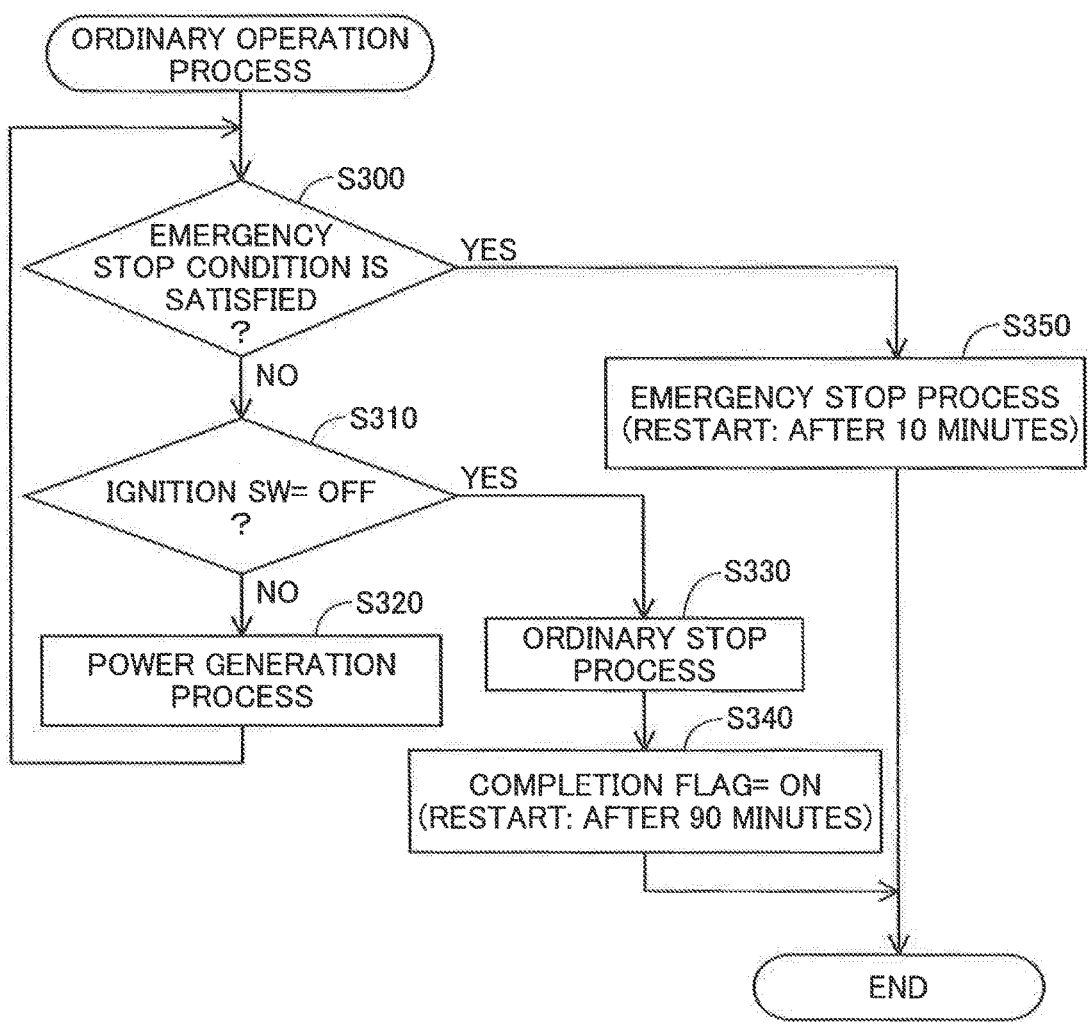

FUEL CELL SYSTEM AND EMERGENCY STOP METHOD

CROSS-REFERENCE TO RELATED APPLICATIONS

The present application claims priority from Japanese patent application No. 2015-126287 filed on Jun. 24, 2015, the content of which is hereby incorporated by reference into this application.

BACKGROUND

Field

The present invention relates to a fuel cell system.

Related Art

A technique described in JP 2015-90779A with regard to a fuel cell system continues power generation by a fuel cell at a system stop time until the amount of water included in the fuel cell is reduced to a predetermined level or below. This suppresses the fuel cell from being frozen during suspension of the system.

The fuel cell system may be stopped immediately without performing a process that is ordinarily performed at the system stop time (hereinafter referred to as ordinary stop process) when an emergency stop of the system is required by some cause, for example, in the case where a fuel lid for supplying a fuel gas is opened or in the case where a component is overheated to or above a predetermined temperature. The ordinary stop process includes, for example, a water drainage process that discharges water included in the fuel cell and a cathode sealing process that suppresses invasion of the air into a cathode in order to suppress deterioration of a catalyst in the fuel cell.

Some of the causes of such an emergency stop may be eliminated after elapse of a predetermined time period. For example, when opening of the fuel lid is the cause of an emergency stop, closing the fuel lid eliminates the cause of the emergency stop. In another example, when overheat of the component to or above the predetermined temperature is the cause of an emergency stop, decreasing the temperature of the component below the predetermined temperature eliminates the cause of the emergency stop. After elimination of the cause of the emergency stop, it is preferable that the fuel cell system performs the ordinary stop process that is not performed at the time of an emergency stop. A configuration of monitoring whether the cause of an emergency stop is eliminated after the emergency stop to perform the ordinary stop process, however, needs to continuously supply electric power to the component required for monitoring. This results in increasing the power consumption.

SUMMARY

In order to solve at least part of the above problems, the invention may be implemented by any of the following aspects.

(1) According to one aspect of the invention, there is provided a fuel cell system. This fuel cell system comprises a fuel cell; a fuel gas flow path that is configured to supply a fuel gas to the fuel cell; an oxidizing gas flow path that is configured to supply an oxidizing gas to the fuel cell; and a controller that is configured to control power generation by the fuel cell. At an ordinary stop time of the fuel cell system, the controller completes an ordinary stop process that includes at least one of a water drainage process that discharges water from at least one of the fuel gas flow path and the oxidizing gas flow path and a cathode sealing process that seals the oxidizing gas flow path, and subsequently stops the fuel cell system. When the fuel cell system satisfies a predetermined emergency stop condition, the controller does not perform at least part of the ordinary stop process but performs an emergency stop process that sets the fuel cell system to be restarted after elapse of a first time period since a stop of the fuel cell system and subsequently stops the fuel cell system. The controller restarts the fuel cell system after elapse of the first time period since a stop of the fuel cell system and performs a restart process that performs the ordinary stop process. When the fuel cell system satisfies the emergency stop condition, the fuel cell system of this aspect is set to be restarted after elapse of the first time period, prior to being stopped. The fuel cell system is then restarted according to this setting and performs the ordinary stop process. This configuration eliminates the need to monitor whether the emergency stop condition is unsatisfied after an emergency stop and thereby prevents electric power from being continuously consumed for such monitoring. This saves the amount of power consumption after the emergency stop.

(2) In the fuel cell system of the above aspect, the controller may perform an uncompleted part of the ordinary stop process in the restart process. The fuel cell system of this aspect enables the ordinary stop process to be quickly completed after a restart.

(3) In the fuel cell system of the above aspect, the ordinary stop process may include a water drainage process that discharges water from the fuel gas flow path. The controller may perform a leakage detection process that detects whether a leakage of the fuel gas from the fuel gas flow path occurs, prior to performing the water drainage process in the restart process. When a leakage of the fuel gas is detected in the leakage detection process, the controller may suspend the restart process without performing the water drainage process. When no leakage of the fuel gas is detected in the leakage detection process, the controller may perform the water drainage process. The fuel cell system of this aspect suppresses leakage of the fuel gas from the fuel gas flow path during execution of the water drainage process.

(4) In the fuel cell system of the above aspect, the controller may determine whether a component used for the ordinary stop process has a failure, prior to performing the ordinary stop process in the restart process. When it is determined that the component used for the ordinary stop process has a failure, the controller may suspend the restart process without performing the ordinary stop process. When it is determined that no component used for the ordinary stop process has a failure, the controller may perform the ordinary stop process. The fuel cell system of this aspect prevents the ordinary stop process from being performed uselessly in the case where the component used for the ordinary stop process has a failure.

(5) In the fuel cell system of the above aspect, when the fuel cell system satisfies the emergency stop condition in the restart process, the controller may perform the emergency stop process. When the fuel cell system does not satisfy the emergency stop condition in the restart process, the controller may not perform the emergency stop process. The fuel cell system of this aspect is restarted after an emergency stop until the emergency stop condition is unsatisfied. This enhances the certainty that the ordinary stop process is performed in the fuel cell system.

(6) In the fuel cell system of the above aspect, when the ordinary stop process is completed, the controller may set the fuel cell system to be restarted after elapse of a second time period, which is longer than the first time period, since a stop of the fuel cell system, and may subsequently stop the fuel cell system. The controller may restart the fuel cell after elapse of the second time period since a stop of the fuel cell system and may perform a predetermined process. The fuel cell system of tis aspect is restarted at the earlier timing after an emergency stop, compared with the timing after completion of the ordinary stop process. This allows the ordinary stop process to be performed at the earlier timing after an emergency stop.

The invention may be implemented by any of various aspects other than the aspects of the fuel cell system described above, for example, a vehicle equipped with the fuel cell system or a control method of the fuel cell system.

BRIEF DESCRIPTION OF DRAWINGS

FIG. 4 is a flowchart showing a restart process; and

FIG. 5 is a flowchart showing an ordinary operation process.

DETAILED DESCRIPTION

A. First Embodiment

Figure 1:
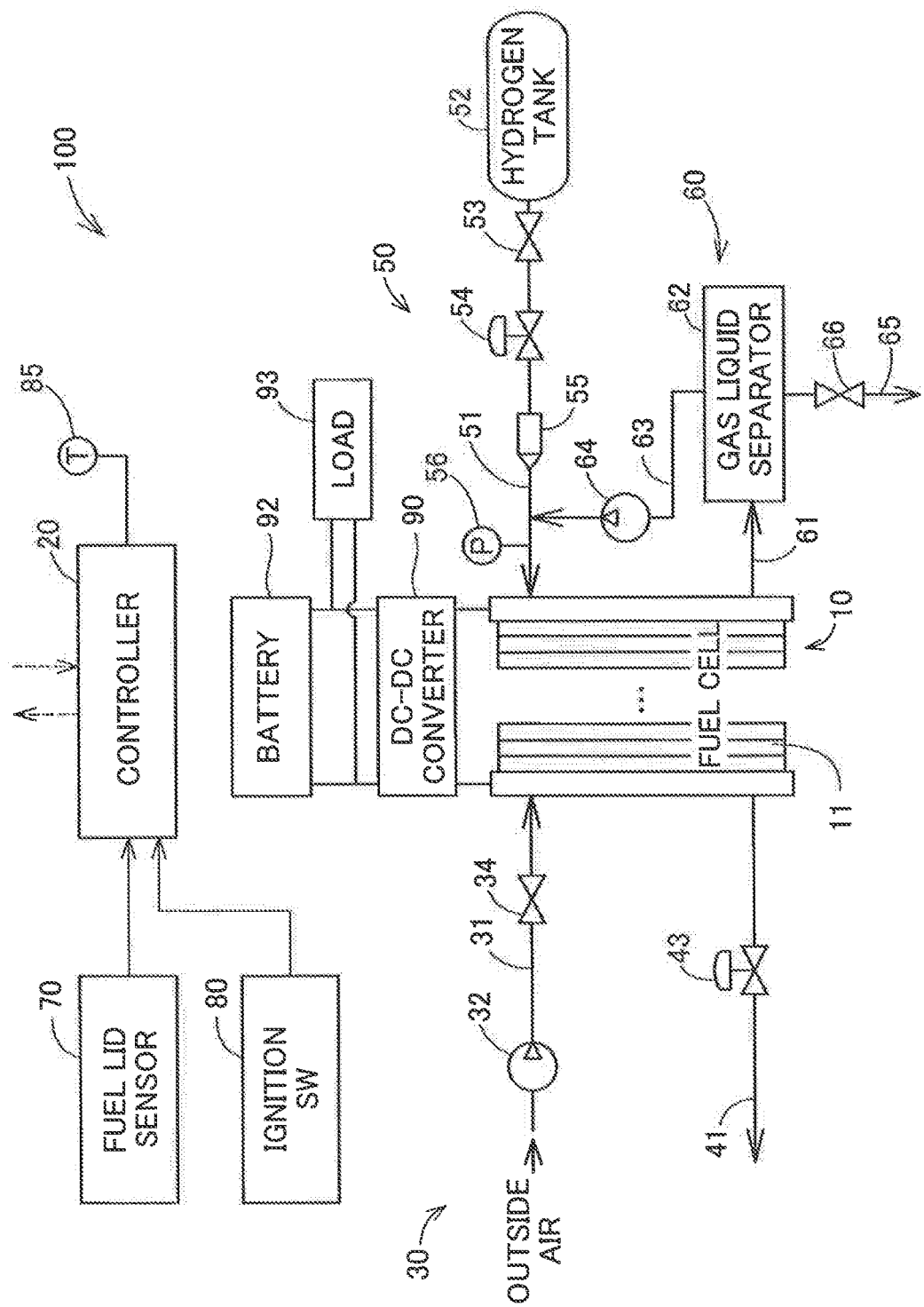
FIG. 1 is a schematic diagram illustrating the configuration of a fuel cell system.

FIG. 1 is a schematic diagram illustrating the configuration of a fuel cell system 100 according to a first embodiment of the invention. The fuel cell system 100 includes a fuel cell 10, a controller 20, an oxidizing gas flow path 30 and a fuel gas flow path 50. The fuel cell system 100 of this embodiment is mounted on a vehicle and is used as a power source of the vehicle.

The fuel cell 10 is a polymer electrolyte fuel cell that receives supplies of hydrogen (fuel gas) and the air (oxidizing gas) as reactive gases and generates electric power. The fuel cell 10 has a stacked structure by stacking a plurality of cells 11. Each cell 11 includes a membrane electrode assembly having electrodes placed on the respective surfaces of an electrolyte membrane, and a pair of separators placed across the membrane electrode assembly. The electric power generated by the fuel cell 10 is accumulated into a battery 92 via a DC-DC converter 90. Various loads 93 are connected with the battery 92. An air compressor 32, a circulation pump 64 and various valves described later receive electric power supplied from the fuel cell 10 or the battery 92 to be driven.

The oxidizing gas flow path 30 is a flow path arranged to supply the fuel gas to the fuel cell 10. The oxidizing gas flow path 30 includes an oxidizing gas pipe 31, an air compressor 32, an on-off valve 34, a cathode off-gas pipe 41 and a pressure regulator 43. The oxidizing gas flow path 30 includes cathode-side flow paths formed inside of the fuel cell 10.

The air compressor 32 is connected with the fuel cell 10 via the oxidizing gas pipe 31. The air compressor 32 compresses the air taken in from the outside and supplies the compressed air as the oxidizing gas to the fuel cell 10, in response to a control signal from the controller 20.

The on-off valve 34 is provided between the air compressor 32 and the fuel cell 10 and is opened and closed according to the flow of the supplied air in the oxidizing gas pipe 31. More specifically, the on-off valve 34 is normally closed and is opened by supply of the air having a predetermined pressure from the air compressor 32 to the oxidizing gas pipe 31.

The cathode off-gas pipe 41 is arranged to discharge a cathode off-gas from the cathode of the fuel cell 10 out of the fuel cell system 10. The pressure regulator 43 regulates the pressure of the cathode off-gas in the cathode off-gas pipe 41 (back pressure of the fuel cell 10), in response to a control signal from the controller 20.

The fuel gas flow path 50 is a flow path arranged to supply the fuel gas to the fuel cell 10. The fuel as flow path 50 includes a fuel gas pipe 51, a hydrogen tank 52, an on-off valve 53, a regulator 54, an injector 55, a pressure sensor 56, an anode off-gas pipe 61, a gas liquid separator 62, a circulation pipe 63, a circulation pump 64, a drainage pipe 65 and a drainage valve 66. The fuel gas flow path 50 includes anode-side flow paths formed inside of the fuel cell 10.

The hydrogen tank 52 is connected with the anode of the fuel cell 10 via the fuel gas pipe 51, and hydrogen filled in the hydrogen tank 52 is supplied to the fuel cell 10. The on-off valve 53, the regulator 54, the injector 55 and the pressure sensor 56 are provided in this sequence from the upstream side, i.e., the hydrogen tank 52-side, in the fuel gas pipe 51.

The on-off valve 53 is opened and closed in response to a control signal from the controller 20 to control the inflow of hydrogen from the hydrogen tank 52 to the upstream side of the injector 55. The on-off-valve 53 is closed at a stop of the fuel cell system 100. The regulator 54 regulates the pressure of hydrogen on the upstream side of the injector 55, in response to a control signal from the controller 20. The injector 55 is an electromagnetic on-off valve having a valve element that is electromagnetically driven based on a driving cycle and a valve-opening time set by the controller 20. The controller 20 controls the driving cycle and the valve-opening time of the injector 55, so as to regulate the amount of hydrogen that is to be supplied to the fuel cell 10.

The anode off-gas pipe 61 is a pipe arranged to connect the outlet of the anode of the fuel cell 10 with the gas liquid separator 62. The anode off-gas pipe 61 guides an anode off-gas including unreacted gas (for example, hydrogen and nitrogen) that is not used for the power generation reaction, to the gas liquid separator 62.

The gas liquid separator 62 is connected with the circulation pipe 63 and with the drainage pipe 65. The gas liquid separator 62 separates a gas component included in the anode off-gas from water. The gas liquid separator 62 guides the gas component to the circulation pipe 63, while guiding water to the drainage pipe 65.

The circulation pipe 63 is connected with the fuel gas pipe 51 on the downstream side of the injector 55. The circulation pump 64 is provided in the circulation pipe 63 and is driven in response to a control signal from the controller 20. This circulation pump 64 serves to feed hydrogen included in the gas component separated by the gas liquid separator 62, to the fuel gas pipe 51. As described above, the fuel cell system 100 circulates hydrogen included in the anode off-gas and resupplies the hydrogen to the fuel cell 10. This improves the use efficiency of hydrogen.

The drainage pipe 65 is a pipe arranged to discharge water that is separated by the gas liquid separator 62, out of the fuel cell system 100. The drainage valve 66 is provided in the drainage pipe 65 and is opened and closed in response to a control signal from the controller 20. The controller 20 normally closes the drainage valve 66 during operation of the fuel cell system 100 and opens the drainage valve 66 at a preset timing to discharge water in the fuel gas flow path 50 and impurity included in the anode off-gas.

The controller 20 is configured as a computer including a CPU, a memory and interface circuits connected with the respective components described above. The CPU executes a control program stored in the memory to perform various processes described above and perform operation control of the fuel cell system 100. The controller 20 is connected with a fuel lid sensor 70, an ignition switch 80 and an ambient temperature sensor 85. The fuel lid sensor 70 is a sensor configured to detect the open-close state of a lid (fuel lid) that covers a supply port used for supplying the fuel gas to the hydrogen tank 52. The ignition switch 80 is a switch operated by the user to start and stop the fuel cell system 100. The controller 20 is operated with electric power supplied from the battery 92.

Although the details of the respective processes will be described later, at an ordinary stop time of the fuel cell system 100, the controller 20 serves to stop the fuel cell system 100 after completing an ordinary stop process including at least one of a water drainage process that discharges water from at least one of the fuel gas flow path 50 and the oxidizing gas flow path 30 and a cathode sealing process that seals the oxidizing gas flow path 30. When the fuel cell system 100 satisfies a predetermined emergency stop condition, the controller 20 does not perform at least part of the ordinary stop process but serves to perform an emergency stop process that stops the fuel cell system 100 after configuring settings to restart the fuel cell system 100 after elapse of a first time period since a stop of the fuel cell system 100. Additionally, the controller 20 serves to perform a restart process that restarts the fuel cell system 100 after elapse of the first time period since the stop of the fuel cell system 100 according to the settings described above and then performs the ordinary stop process.

Figure 2:
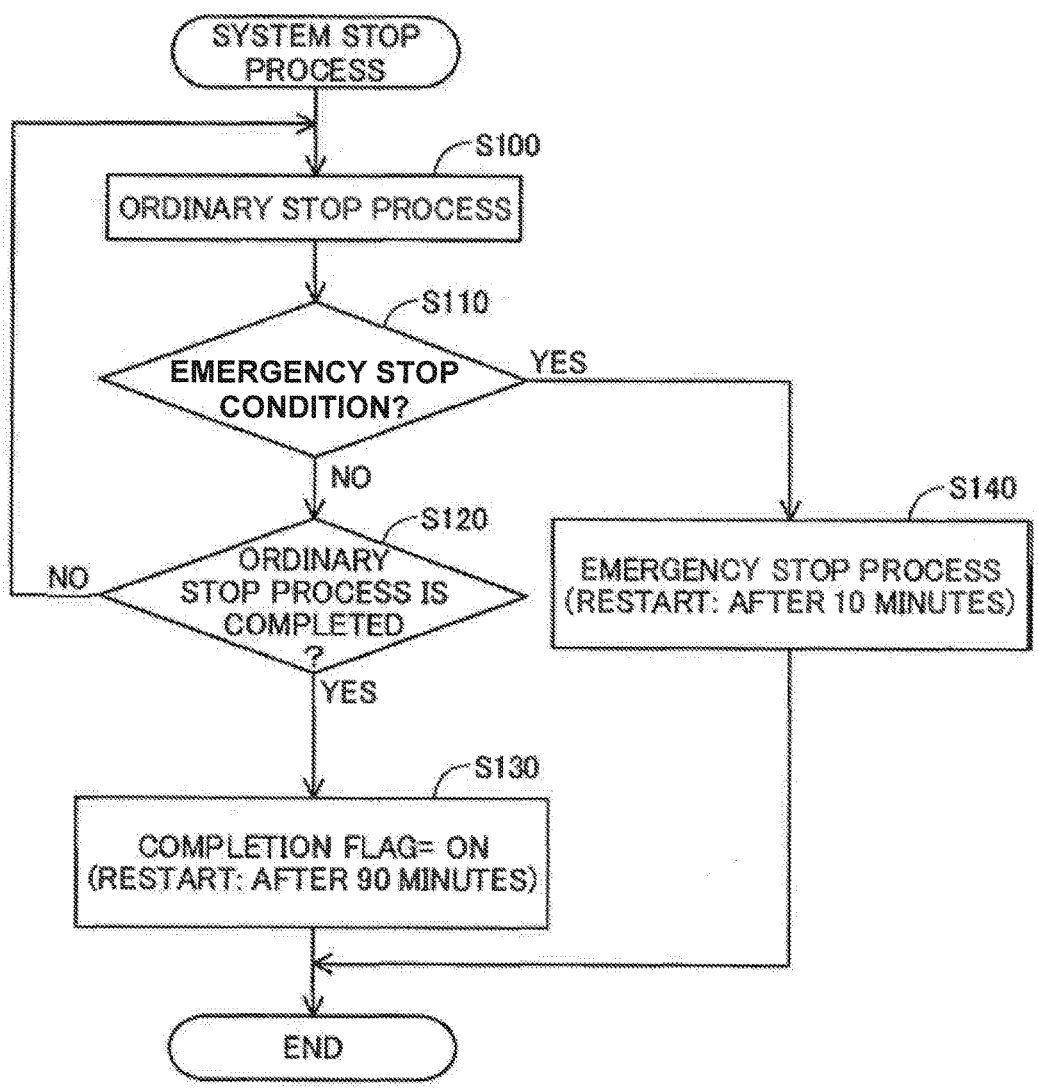
FIG. 2 is a flowchart showing a system stop process.

FIG. 2 is a flowchart showing a system stop process performed by the controller 20. This system stop process is triggered when the user turns off the ignition switch 80. The system stop process is started on the premise that a completion flag described later is OFF.

When the system stop process is triggered, the controller 20 first performs an ordinary stop process (step S100). The ordinary stop process denotes a series of processes performed to normally stop the fuel cell system 100.

Figure 3:
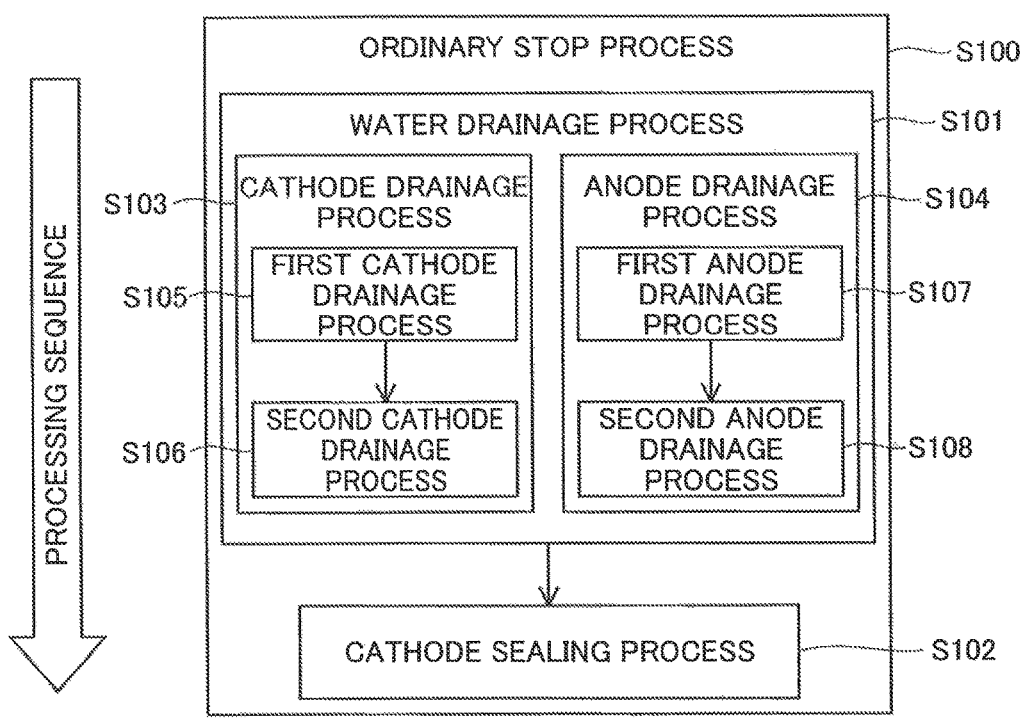
FIG. 3 is a diagram illustrating the flow of an ordinary stop process.

FIG. 3 is a diagram illustrating the flow of the ordinary stop process. According to this embodiment, the ordinary stop process S100 includes a water drainage process S101 and a cathode sealing process S102.

The water drainage process S101 is a process of discharging water from the fuel cell system 10, in order to suppress water in the fuel cell system 100 from being frozen after a stop of the system. The water drainage process S101 includes a cathode drainage process S103 and an anode drainage process S104. According to this embodiment, the cathode drainage process S103 and the anode drainage process S104 are performed simultaneously in parallel. According to a modification, after completion of one of the cathode drainage process S103 and the anode drainage process S104, the other may be performed.

The cathode drainage process S103 is a process of discharging water from the oxidizing gas flow path 30. In this cathode drainage process S103, the controller 20 opens the pressure regulator 43 and drives the air compressor 32 to discharge water from the oxidizing gas pipe 31, the cathode-side flow paths formed inside of the fuel cell 10 and the cathode off-gas pipe 41. The cathode drainage process S103 includes a first cathode drainage process S105 and a second cathode drainage process S106. The second cathode drainage process S106 is performed subsequent to the first cathode drainage process S105.

In the first cathode drainage process S105, the controller 20 increases the flow rate of the air that is flowed by the air compressor 32 and discharges water accumulated in the oxidizing gas flow path 30. In the second cathode drainage process S106, the controller 20 decreases the flow rate of the air flowed by the air compressor 32 to be lower than the flow rate in the first cathode drainage process S105 and discharges water for a predetermined time period such as to reduce the water content of the fuel cell 10 to or below a predetermined amount.

The anode drainage process S104 is a process of discharging water from the fuel gas flow path 50. In this anode drainage process S104, the controller 20 drives the circulation pump 64 and the drainage valve 66 to discharge water from the fuel gas pipe 51, the anode-side flow paths formed inside of the fuel cell 10, the anode off-gas pipe 61 and the gas liquid separator 62. The anode drainage process S104 includes a first anode drainage process S107 and a second anode drainage process S103. The second anode drainage process S108 is performed subsequent to the first anode drainage process S107.

In the first anode drainage process S107, the controller 20 opens the drainage valve 66 at regular intervals while driving the circulation pump 64, so as to discharge water accumulated in the fuel gas flow path 50. In the second anode drainage process S108, the controller 20 opens the drainage valve 66 for a long time period to discharge water from the gas liquid separator 62.

After completion of the water drainage process S101 described above, the controller 20 performs the cathode sealing process S102. In this cathode sealing process S102, the controller 20 stops the air compressor 32 and closes the pressure regulator 43, so as to suppress invasion of the air into the fuel cell 10 during suspension of the fuel cell system 100. Performing the cathode sealing process S102 suppresses invasion of oxygen into the cathode during suspension of the fuel cell system 100 and thereby suppresses deterioration of the catalyst of the fuel cell 10 due to the carbon oxidation reaction during suspension of the fuel cell system 100.

In the ordinary stop process (step S100) of FIG. 2, the series of processes shown in FIG. 3 are performed in the sequence shown in FIG. 3. During the series of processes, the controller 20 determines whether the fuel cell system 100 satisfies an emergency stop condition (step S110). When the fuel cell system 100 does not satisfy the emergency stop condition (step S110: NO), the controller 20 subsequently determines whether the ordinary stop process shown in FIG. 3 is fully completed (step S120). When the ordinary stop process is not yet completed (step S120: NO), the controller 20 returns the processing flow to step S100 and continues the ordinary stop process shown in FIG. 3. FIG. 2 shows the processes of steps S100 to S120 in a stepwise manner. This is, however, for the convenience of illustration. In the actual flow, the processes of steps S110 and S120 are repeatedly performed at predetermined control timings during execution of the step S100. The same applies to the processes of steps S240 to S260 of FIG. 4 described later.

When it is determined at step S120 that the ordinary stop process is completed (step S120 YES), the controller 20 sets a completion flag ON and stores this information (hereinafter referred to as "completion flag information") in a non-volatile manner in the memory of the controller 20 (step S130). The controller 20 also sets a time period until a restart to 90 minutes and stores this information (hereinafter referred to as "restart time information") in a non-volatile manner in the memory (step S130). The completion flag denotes a flag indicating that the ordinary stop process of FIG. 3 is fully completed. Setting the time period until a restart at step S130 after completion of the ordinary stop process causes an anti-freezing process described later to be performed after a stop of the fuel cell system 100.

After storing the completion flag information and the restart time information in a non-volatile manner into the memory at step S130 as described above, the controller 20 stops the fuel cell system 100. According to this embodiment, "stop the fuel cell system 100" means that the controller 20 stops the fuel cell system 100 in a state that allows to be restarted after elapse of the time period stored in the memory as the restart time information.

When the controller 20 determines that the fuel cell system 100 satisfies the emergency stop condition (step S110: YES) during execution of the respective processes included in the ordinary stop process shown in FIG. 3, the controller 20 performs an emergency stop process (step S140). According to this embodiment, the controller 20 determines that the fuel cell system 100 satisfies the emergency stop condition in response to detection of an opening action of the fuel lid by the fuel lid sensor 70, in response to detection of a failure of any of components such as sensors and actuators constituting the fuel cell system 100 and in response to detection of a temperature rise of any of components constituting the fuel cell system 100 over a predetermined temperature. The techniques of detecting a failure of a component and detecting temperature of a component are known techniques and are not described in detail.

In the emergency stop process of step S140, the controller 20 suspends the ordinary stop process that is currently being performed and stores information showing the progress status of the ordinary stop process (hereinafter referred to as progress information) in a non-volatile manner into the memory of the controller 20. The controller 20 also sets the time period until a restart to 10 minutes and stores the restart time information in a non-volatile manner into the memory. After performing the emergency stop process to store the progress information and the restart time information into the memory, the controller 20 stops the fuel cell system 100. In other words, when the fuel cell system 100 satisfies the emergency stop condition, the controller 20 stops the fuel cell system 100 while suspending the ordinary stop process. When the fuel cell system 100 satisfies the emergency stop condition, the cathode sealing process S102 may be uncompleted while the water drainage process S101 is completed, or part of the water drainage process S101 and the cathode sealing process S102 may be uncompleted In the embodiment, the time period set when the fuel cell system 100 satisfied the emergency stop condition is called "first time period". The first time period is determined in advance, based on a time period from the time when the fuel cell system 100 satisfies the emergency stop condition to the time when the emergency stop condition is expected to be unsatisfied. More specifically, the first time period may be determined, for example, based on a time period from the time when the fuel lid is opened to the time when the fuel lid is expected to be closed or based on a time period from the time when the temperature of a component increases to or above a certain temperature to the time when the temperature is expected to decrease below the certain temperature. According to this embodiment, this first time period is set to 10 minutes. The too long first time period is likely to cause deterioration of the catalyst, while the too short first time period is likely to make the user recognize execution of a restart process and feel uncomfortable. It is accordingly preferable that the first time period is, for example, in a range of 5 minutes to 30 minutes.

In the embodiment, the time period until a restart set after completion of the ordinary stop process is called "second time period". The second time period is set to 90 minutes according to this embodiment but may be 30 to 120 minutes. This second time period may be appropriately shortened to be shorter than the first time period by repeating an anti-freezing process in a restart process described below. The second time period set immediately after completion of the ordinary stop process is always longer than the first time period according to this embodiment.

FIG. 4 is a flowchart showing a restart process performed after the fuel cell system 100 is stopped by the system stop process shown in FIG. 2. When the time period stored as the restart time information in the memory of the controller 20 has elapsed since a stop of the fuel cell system 100, the controller 20 restarts the fuel cell system 100 and performs this restart process.

When the restart process is triggered, the controller 20 first determines whether the completion flag is ON, based on the completion flag information stored in the memory of the controller 20 (step S200). The completion flag set to ON (step S200: YES) indicates that the fuel cell system 100 is normally stopped. In this case, the controller 20 performs an anti-freezing process (step S205). In this anti-freezing state, the controller 20 uses the ambient temperature sensor 85 to measure the ambient temperature, advances a restart timing shortens the second time period) with a decrease of the ambient temperature and updates the restart time information. When the measured ambient temperature becomes lower than a predetermined temperature (for example, 5° C.), the controller 20 performs a process equivalent to the water drainage process S101 shown in FIG. 3 to discharge water included in the fuel cell 10 and suppress freezing during suspension of the fuel cell system 100. After completion of the anti-freezing process, the controller 20 terminates the restart process. This anti-freezing process advances the restart timing with a decrease of the ambient temperature. This causes water to be discharged at the earlier timing, thus suppressing freezing.

When it is determined at step S200 that the completion flag is OFF (step S200: NO), on the other hand, the controller 20 subsequently determines whether any component required for the ordinary stop process has a failure (step S210). The components required for the ordinary stop process include, for example, the air compressor 32, the circulation pump 64, and various valves provided in the oxidizing gas flow path 30 and the fuel gas flow path 50. When any component required for the ordinary stop process has a failure (step S210: YES), the controller 20 terminates the restart process without performing the ordinary stop process and without setting a next restart time. In the case where no next restart time is set, the controller 20 does not perform a next restart. Accordingly, when any component required for the ordinary stop process has a failure, the fuel cell system 100 is not automatically restarted until fixing of the component.

When no component required for the ordinary stop process has a failure (step S210: NO), the controller 20 subsequently performs a leakage detection process to detect a hydrogen leakage (step S220). In this leakage detection process, the controller 20 supplies a predetermined pressure of hydrogen into the fuel gas flow path 50 and subsequently closes the on-off valve 53, the injector 55 and the drainage valve 66. When a decrease of the hydrogen pressure to a specified pressure level or lower after elapse of a predetermined time period is detected by the pressure sensor 56, the controller 20 determines that there is a hydrogen leakage. The leakage detection process may detect a hydrogen leakage at different locations in the fuel gas flow path 50 in a stepwise manner, for example, between the injector 55 and the on-off valve and downstream of the injector 55.

When a hydrogen leakage is detected (step S230: YES) by the leakage detection process, the controller 20 terminates the restart process without performing the ordinary stop process and without setting a next restart time. Accordingly; when there is a hydrogen leakage, the fuel cell system 100 is not automatically restarted until fixing of the hydrogen leakage. In the case where a hydrogen leakage is detected at step S230, the controller 20 may provide a display indicating the occurrence of a hydrogen leakage in a predetermined display device provided in the fuel cell system 100.

When no hydrogen leakage is detected (step S230: NO) by the leakage detection process, on the other hand, the controller 20 performs a process similar to the ordinary stop process S100 shown in FIG. 3 (step S240). At step S240, however, the controller 20 performs uncompleted part of the ordinary stop process S100 in the sequence shown in FIG. 3, based on the progress information stored in the memory. For example, in the case where the water drainage process S101 is fully completed but the cathode sealing process S102 is not completed, the controller 20 performs the cathode sealing process S102. In another example, in the case where only the first cathode drainage process S105 of the water drainage process S101 is completed, the controller 20 performs the second cathode drainage process S106, the anode drainage process S104 and the cathode sealing process S102.

During execution of this ordinary stop process, the controller 20 constantly determines whether the fuel cell system 100 satisfies the emergency stop condition (step S250). When the emergency stop condition is not satisfied (step S250: NO), the controller 20 determines whether the ordinary stop process shown in FIG. 3 is fully completed (step S260). When the ordinary stop process is not yet completed (step S260: NO), the controller 20 returns the processing flow to step S240 and continues the ordinary stop process shown in FIG. 3.

When it is determined at step S260 that the ordinary stop process is completed (step S260: YES), the controller 20 sets the completion flag ON and stores the completion flag information in a non-volatile manner into the memory of the controller 20, while setting the time period until a restart to 90 minutes and storing the restart time information in a non-volatile manner into the memory (step S270). The controller 20 then stops the fuel cell system 100.

When the controller 20 determines that the fuel cell system 100 satisfies the emergency stop condition (step S250: YES) during execution of the respective processes included in the ordinary stop process shown in FIG. 3, the controller 20 performs an emergency stop process (step S280). In this emergency stop process, the controller 20 suspends the ordinary stop process that is currently being performed and stores the progress information into the memory of the controller 20. The controller 20 also sets the time period until a restart to 10 minutes and stores the restart time information in a non-volatile manner into the memory. After performing the emergency stop process to store the progress information and the restart time information into the memory, the controller 20 stops the fuel cell system 100.

In the restart process of FIG. 4, in the case where the fuel cell system 100 satisfies the emergency stop condition and suspends the ordinary stop process, the fuel cell system 100 is restarted after elapse of the predetermined time period.

As described above, in the case of an emergency stop of the fuel cell system 100, the fuel cell system 100 of the embodiment is set to be restarted after elapse of the first time period, prior to being stopped. The fuel cell system 100 is then restarted according to this setting and performs the ordinary stop process. This configuration eliminates the need to monitor whether the emergency stop condition is unsatisfied after an emergency stop and thereby prevents electric power from being continuously consumed for such monitoring. This saves the amount of power consumption after the emergency stop.

According to this embodiment, the restart process after an emergency stop performs the uncompleted part of the ordinary stop process that has not been performed in the system stop process. This enables the ordinary stop process to be quickly completed after a restart.

According to this embodiment, in the case of detection of a hydrogen leakage in the restart process, the ordinary stop process is not performed. This suppresses a hydrogen leakage from occurring during the anode drainage process.

According to this embodiment, in the case of detection of a failure in any of the components used for the ordinary stop process in the restart process, the ordinary stop process is not performed. This prevents the ordinary stop process from being performed uselessly when a component used for the ordinary stop process has a failure.

According to this embodiment, when the emergency stop condition is satisfied again in the restart process after an emergency stop, the emergency stop process is performed to set the time period until a restart. This enhances the certainty that the ordinary stop process is performed in the fuel cell system 100.

According to this embodiment, the tune period until a restart set in the case of an emergency stop (first time period) is shorter than the time period until a restart set in the case of normal completion of the ordinary stop process (second time period). Accordingly the fuel cell system 100 is restarted at an earlier timing after an emergency stop, compared with the restart timing after completion of the ordinary stop process. This allows the ordinary stop process to be performed at the earlier timing after an emergency stop.

B. Second Embodiment

The first embodiment described above determines whether the fuel cell system 100 satisfies the emergency stop condition during execution of the system stop process shown in FIG. 2. A second embodiment, on the other hand, determines whether the fuel cell system 100 satisfies an emergency stop condition during ordinary operation, instead of during execution of the system stop process. The fuel cell system 100 of the second embodiment has the same configuration as that of the fuel cell system 100 of the first embodiment. An ordinary operation process described below is performed on the premise that the completion flag is OFF.

FIG. 5 is a flowchart showing an ordinary operation process performed by the controller 20. This ordinary operation process is triggered by an ON operation of the ignition switch 80. In this ordinary operation process, the controller 20 first determines whether the fuel cell system 100 satisfies the emergency stop condition (step S300).

When the fuel cell system 100 does not satisfy the emergency stop condition (step S300: NO), the controller 20 subsequently determines whether the ignition switch 80 is turned OFF (step S310). When the ignition switch 80 is not turned OFF (step S310: NO), the controller 20 continues a power generation process to cause the fuel cell 10 to generate electric power (step S320). When the ignition switch 80 is turned OFF (step S310: YES), on the other hand, the controller 20 performs a process similar to the ordinary stop process S100 shown in FIG. 3 (step S330). After completion of the ordinary stop process, the controller 20 sets the completion flag ON, sets the time period, until a restart to 90 minutes, and stops the fuel cell system 100.

When it is determined at step S300 that the fuel cell system 100 satisfies the emergency stop condition (step S300: YES), on the other hand, the controller 20 does not perform the ordinary stop process but performs an emergency stop process (step S350). In this emergency stop process, the controller 20 sets the time period until a restart to 10 minutes and stops the fuel cell system 100.

After the ordinary operation process of FIG. 5 is terminated and the fuel cell system 100 is stopped, the second embodiment performs the restart process shown in FIG. 4, like the first embodiment.

As described above, the configuration of the second embodiment allows for an emergency stop of the fuel cell system 100 when the fuel cell system 100 satisfies the emergency stop condition during ordinary operation of the fuel cell system 100. According to a modification of this embodiment, the controller 20 may perform the system stop process shown in FIG. 2, instead of the processing of steps S330 and S340 of FIG. 5. Performing the system stop process of FIG. 2 instead of steps S330 and S340 of FIG. 5 enables the emergency stop process to be performed when the fuel cell system 100 satisfies the emergency stop process during execution of the ordinary stop process.

C. Modifications

<Modification 1>

According to the above embodiment, for example, the ordinary stop process (step S240) in the restart process shown in FIG. 4 performs the uncompleted part of the ordinary stop process that is not performed in the system stop process. According to a modification, the controller 20 may restart the ordinary stop process from the beginning as the ordinary stop process in the restart process.

<Modification 2>

According to the above embodiment, in the case of detection of a hydrogen leakage, the restart process shown in FIG. 4 does not perform the entire ordinary stop process. According to a modification, in the case of detection of a hydrogen leakage, the controller 20 may not perform only the anode drainage process S104 that is likely to be affected by the hydrogen leakage, but may perform the other processes that are not affected by the hydrogen leakage, for example, the cathode drainage process S103 and the cathode sealing process S102.

<Modification 3>

According to the above embodiment, the water drainage process S101 shown in FIG. 3 includes the cathode drainage process S103 and the anode drainage process S104, and each of these drainage processes S103 and S104 further includes a plurality of processes. This configuration of the processing shown in the above embodiment is, however, only illustrative and is not restrictive. For example, the water drainage process may be further subdivided into a greater number of processes or may be performed as a whole. The water drainage process S101 may include only one of the cathode drainage process S103 and the anode drainage process S104.

<Modification 4>

According to the above embodiment, the controller 20 performs both the water drainage process S101 and the cathode sealing process S102 as the ordinary stop process S100. According to a modification, the controller 20 may perform only the water drainage process S101 as the ordinary stop process S100. Alternatively the controller 20 may perform only the cathode sealing process S102 as the ordinary stop process S100.

<Modification 5>

According to the above embodiment, after an ordinary stop of the fuel cell system 100, the fuel cell system 100 is restarted after elapse of the second time period to perform the anti-freezing process. The fuel cell system 100 restarted after an ordinary stop may, however, not necessarily perform the anti-freezing process but may perform the water drainage process irrespective of the ambient temperature or may perform the leakage detection process.

<Modification 6>

According to the above embodiment, even when the ordinary stop process is normally completed, the time period until a restart is set and the fuel cell system 100 is restarted. According to a modification, when the ordinary stop process is normally completed, the fuel cell system 100 may not be restarted.

<Modification 7>

The fuel cell system 100 of the above embodiment is mounted on the vehicle. The fuel cell system 100 may, however, be mounted on another moving body such as aircraft or boat or ship. The fuel cell system 100 may also be installed in a building or at a land as a power source for household use or for business use. The fuel cell 10 is not limited to the polymer electrolyte fuel cell but may be any of various other types of fuel cells, for example, phosphoric acid fuel cell.

The invention is not limited to any of the embodiment and the modifications described above but may be implemented by a diversity of other configurations without departing from the scope of the invention. For example, the technical features of any of the embodiment and the modifications corresponding to the technical features of each of the aspects described in SUMMARY may be replaced or combined appropriately in order to solve part or all of the problems described above or in order to achieve part or all of the advantageous effects described above. Any of the technical features may be omitted appropriately unless the technical feature is described as essential herein.

What is claimed is:

1. A fuel cell system, comprising:
   a fuel cell;
   a fuel gas flow path that is configured to supply a fuel gas to the fuel cell;
   an oxidizing gas flow path that is configured to supply an oxidizing gas to the fuel cell; and
   a controller that is programmed to control power generation by the fuel cell, wherein
   at an ordinary stop time of the fuel cell system, the controller is programmed to complete an ordinary stop process that includes one or sequentially both of a water drainage process that discharges water from at least one of the fuel gas flow path and the oxidizing gas flow path and a cathode sealing process that seals the oxidizing gas flow path, and subsequently stops the fuel cell system, when the fuel cell system satisfies a predetermined emergency stop condition during execution of the ordinary stop process, the controller is programmed to suspend the ordinary stop process and is programmed to perform an emergency stop process that stops the fuel cell system, and the controller is programmed to perform a restart process which restarts the fuel cell system after elapse of a first time period since the stop of the fuel cell system during the emergency stop process, wherein the restart process includes an uncompleted part of the ordinary stop process from where the ordinary stop process was suspended.

2. The fuel cell system according to claim 1,
wherein the ordinary stop process includes a water drainage process that discharges water from the fuel gas flow path, and the controller is programmed to perform a leakage detection process that detects whether a leakage of the fuel gas from the fuel gas flow path occurs, prior to performing the water drainage process in the restart process, wherein when a leakage of the fuel gas is detected in the leakage detection process, the controller is programmed to suspend the restart process without performing the water drainage process, and when no leakage of the fuel gas is detected in the leakage detection process, the controller is programmed to perform the water drainage process.

3. The fuel cell system according to claim 1,
wherein the controller is programmed to determine whether a component used for the ordinary stop process has a failure, prior to performing the ordinary stop process in the restart process, wherein when it is determined that the component used for the ordinary stop process has a failure, the controller is programmed to suspend the restart process without performing the ordinary stop process, and when it is determined that no component used for the ordinary stop process has a failure, the controller is programmed to perform the ordinary stop process.

4. The fuel cell system according to claim 1,
wherein when the fuel cell system satisfies the emergency stop condition in the restart process, the controller is programmed to perform the emergency stop process, and when the fuel cell system does not satisfy the emergency stop condition in the restart process, the controller is programmed to not perform the emergency stop process.

5. The fuel cell system according to claim 1,
wherein when the ordinary stop process is completed, the controller is programmed to set the fuel cell system to be restarted after elapse of a second time period, which is longer than the first time period, since a stop of the fuel cell system, and subsequently to stop the fuel cell system, and the controller is programmed to restart the fuel cell after elapse of the second time period since a stop of the fuel cell system and to perform a predetermined process which includes at least one of an anti-freezing process, a water drainage process, and a leakage detection process.

* * * * *